United States Patent [19]

Trost et al.

[11] Patent Number: 5,575,260
[45] Date of Patent: Nov. 19, 1996

[54] METHOD AND DEVICE FOR CONTROLLING IGNITION OF AN INTERNAL COMBUSTION ENGINE AS A FUNCTION OF ENGINE RPM

[75] Inventors: Jürgen Trost, Grafenberg; Eberhard Scheiber, Backnang, both of Germany

[73] Assignee: Andreas Stihl, Waiblingen, Germany

[21] Appl. No.: 357,410

[22] Filed: Dec. 16, 1994

[30] Foreign Application Priority Data

Dec. 16, 1993 [DE] Germany .......................... 43 42 932.7

[51] Int. Cl.$^6$ ............................................. F02P 5/145
[52] U.S. Cl. ................................................ 123/418
[58] Field of Search ............................. 123/418, 427, 123/149 C

[56] References Cited

U.S. PATENT DOCUMENTS

| | | | |
|---|---|---|---|
| 4,174,697 | 11/1979 | Podrapsky et al. | 123/418 |
| 4,175,509 | 11/1979 | Orova et al. | 123/418 |
| 4,512,303 | 4/1985 | Watanabe | 123/335 |

FOREIGN PATENT DOCUMENTS

| | | |
|---|---|---|
| 0275984 | 7/1988 | European Pat. Off. . |
| 2709745 | 9/1978 | Germany . |

OTHER PUBLICATIONS

Patent Abstracts of Japan, vol. 001, No. 001, (M–001), Mar. 1, 1977 & JP-A-51-111535 (Nippon Denso Co Ltd) Oct. 1, 1976.

*Primary Examiner*—Andrew M. Dolinar
*Attorney, Agent, or Firm*—Robert W. Becker & Associates

[57] ABSTRACT

A method of controlling ignition of an internal combustion engine as a function of engine RPM includes the steps of revolving a magnet wheel and inducing with the revolving magnet wheel in an induction coil an initial voltage. At least one delay element is provided and the delay element is switched on and off upon engine RPM. A transformed voltage is deduced from the initial voltage via the at least one delay element and the ignition is tripped when the transformed voltage surpasses a preset threshold. The device for performing the method has a magnet wheel rotating with the crankshaft of the engine and an induction coil coordinated therewith wherein an initial voltage is induced in the induction coil by the magnet wheel. A plurality of switchable RC members connected to the induction coil are provided. The switchable RC members have a first capacitor and the RC members are switched on and off depending on engine RPM. A transformed voltage is deduced from the initial voltage via the RC members and detectable at the first capacitor. A switching device, connected to the first capacitor such that the transformed voltage at the first capacitor is supplied to the switching device is provided for comparing the transformed voltage with the preset threshold and for tripping the ignition when the preset threshold is surpassed.

8 Claims, 1 Drawing Sheet

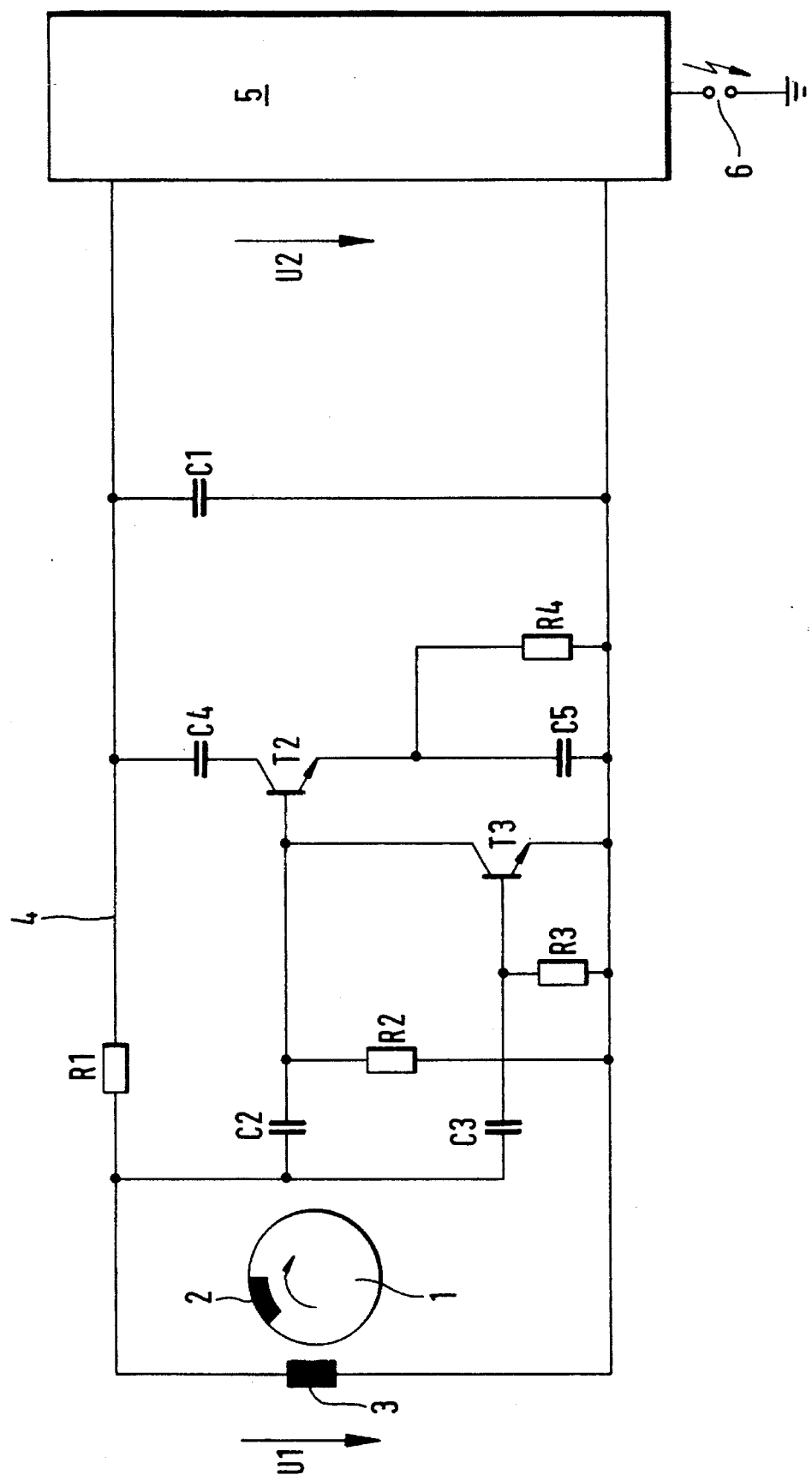

5,575,260

METHOD AND DEVICE FOR CONTROLLING IGNITION OF AN INTERNAL COMBUSTION ENGINE AS A FUNCTION OF ENGINE RPM

BACKGROUND OF THE INVENTION

The present invention relates to a method for controlling ignition of an internal combustion engine as a function of engine rpm (revolution per minute), especially of a two-stroke engine in hand-held working tools such as motor chain saws etc., as well as to a device for performing the inventive method.

In hand-held working tools the drive motor is in most cases a two stroke engine that is provided with a magnetic ignition device. A magnet wheel, which rotates with the crankshaft of the internal combustion engine, induces in a corresponding induction coil a sine-shaped alternating current, the shape and magnitude of which is directly dependent on the RPM. In order to achieve an ignition that is depending on the number of rpms, it is known to employ the amplitude of the induced voltage for triggering the ignition point. For this purpose, the induced voltage is compared to a threshold value in order to trigger the ignition upon reaching the threshold value.

In order to ensure over a wide adjustment range ignition as a function of engine RPM, additional adaptation measures must be taken, for example, the threshold value for the ignition must be varied. This entails a high technical expenditure so that such adjustable ignition devices are often used only in conjunction with high quality working tools. For simpler embodiments of the working tools it is conventional to make the ignition dependent exclusively on reaching the threshold value, i.e., to make the ignition dependent on the amplitude of the induced voltage. Since the amplitude is greatly dependent on temperature, the air gap, magnetization differences, and other parasitic influences, the resulting ignition point is thus very unreliable.

It is therefore an object of the present invention to provide a method for controlling ignition of an internal combustion engine as a function of engine rpm which method ensures with simple components and a simple construction a reliable, variable ignition point adjustment. Furthermore, a device for performing the inventive method is to be provided.

SUMMARY OF THE INVENTION

The method of controlling ignition of an internal combustion engine as a function of engine rpm according to the present invention is primarily characterized by the steps of:

Revolving a magnet wheel;

Inducing with the revolving magnet wheel in an induction coil an initial voltage;

Providing at least one delay element;

Switching on and off the at least one delay element depending on engine rpm;

Deducing a transformed voltage from the initial voltage via the at least one delay element; and Tripping the ignition when the transformed voltage reaches a preset threshold.

Preferably, the method further comprises the step of providing or differentiating members between the induction coil and the delay element. Preferably, the differentiating members perform automatically the switching action.

Expediently, with increasing engine RPM the slope of the curve of the transformed voltage becomes steeper.

The present invention is furthermore concerned with a device for controlling ignition of an internal combustion engine as a function of engine rpm, wherein the ignition is tripped when the transformed voltage surpasses a preset threshold. The device according to the present invention is primarily characterized by:

A magnet wheel rotating with a crankshaft of the engine;

An induction coil coordinated with the magnet wheel, wherein an initial voltage is induced in the induction coil by the magnet wheel;

A plurality of switchable RC members connected to the induction coil, the switchable RC members comprising a first capacitor, wherein the switchable RC members are switched on and off depending on engine rpm and wherein a transformed voltage is deduced from the initial voltage via the RC members and detectable at the first capacitor; and A switching device connected to the first capacitor for comparing the transformed voltage with a preset threshold and for tripping the ignition when the preset threshold is surpassed, wherein the transformed voltage at the first capacitor is supplied to the switching device.

Preferably, a first one of the RC members, comprising the first capacitor, and the induction coil form a closed electrical circuit and the first RC member effects a primary delay.

Advantageously, the device further comprises further capacitors that are switchable on and off parallel to the first capacitor.

Advantageously, the device further comprises at least one switching member for switching the further capacitors. The switching members are actuated as a function of engine rpm.

Expediently, the switching member is a semiconductor controlled by a differentiating member, wherein the semiconductor is preferably a switching transistor.

Preferably, two of the further capacitors together with a switching path of the semiconductor form a parallel branch to the first capacitor.

Advantageously, one of the further capacitors is switched so as to provide dynamic negative feedback and the other further capacitor functioning as a delay member is activated depending on the steepness of the induced voltage.

Expediently, the one further capacitor that provides dynamic negative feedback is connected to a resistor so as to have a defined initial state.

The first derivative $DU1/dt$ of the induced voltage $U1$ provides the slope of the induced voltage whereby from the slope an rpm information can be deduced which is substantially unaffected by temperature, air gap, and magnetization differences. The deduced transformed voltage $U2$ is a delayed voltage of the induced voltage $U1$ which must be influenced by substantially parameter-independent differentiating members as a function of the engine rpm. The transformed voltage $U2$ is compared to a preset threshold value and the ignition is triggered when the transformed voltage reaches the value of the threshold. In this manner, the preset threshold value can remain unchanged over the entire rpm range because by switching on and off the delay members the slope of the transformed voltage can be made steeper or less steep so that the threshold value can be reached earlier or later. With increasing engine rpm it is thus possible to achieve an early adjustment of the ignition point without greater technical expenditure.

An advantageous device for performing the inventive method is provided in the form of RC members (resistance-capacitance members) that can be switched on and off which together with the induction coil form a closed electrical circuit. The voltage at the capacitor within the electrical circuit represents the transformed voltage which is supplied to the switching device for triggering the ignition point.

Preferably, the device comprises an RC member that effects a primary delay and forms together with the induction coil a closed electrical circuit. Parallel to the capacitor of the RC member that effects the primary delay further capacitors can be switched on or off via switching members that can be actuated as a function of the engine rpm. Such a switching member is in a simple construction a semiconductor, especially a switching transistor which is controlled by a differentiating member. The RC member is designed such that from a certain rpm value on a respective capacitor is switched on or off to the capacitor circuit of the RC member that determines the primary delay whereby with a dynamic negative feedback the delay time continuously increases with increasing steepness of the induced voltage U1.

BRIEF DESCRIPTION OF THE DRAWING

The object and advantages of the present invention will appear more clearly from the following specification in conjunction with the only drawing showing an electrical diagram of one embodiment of the present invention.

DESCRIPTION OF PREFERRED EMBODIMENTS

The present invention will now be described in detail with the aid of a specific embodiment utilizing the only figure.

A magnet wheel 1 which rotates with the crankshaft of a non-represented internal combustion engine, especially a two stroke engine, has a magnetized section 2 coordinated with an induction coil 3 connected to the housing. The induction coil 3 forms together with a resistor R1 and a capacitor C1 a common electrical circuit 4 in series connection. The voltage U2 at the capacitor C1 is supplied to a switching device 5 that upon reaching a preset threshold triggers an ignition spark at a spark plug 6 extending into the combustion chamber of the internal combustion engine.

The RC member R1/C1 determines the primary delay. Corresponding to this primary delay, the threshold value is determined whereby upon reaching this threshold value the switching device 5 triggers the ignition spark.

The RC member R1/C1 is a low pass. Parallel to the capacitor C1 a capacitor C4, a switching transistor T2, and a capacitor C5 are provided in series connection. The base of the switching transistor T2 is connected, on the one hand, via capacitor C2 with one end of the induction coil 3 and, on the other hand, via the ohmic resistor R2 with the other side of the induction coil 3. The capacitor C2 and the resistor R2 form a high pass which when a certain engine rpm is reached switches the transistor T2 so that the series connection C4 and C5 is active parallel to the capacitor C1. With the dynamic negative feedback provided by the capacitor C5 of the transistor T2 the capacitors C4, C5 are active in a sliding manner so that with increasing steepness of the induced voltage U1 the delay time increases continuously.

Parallel to capacitor C5 the ohmic resistor R4 is provided which is selected to be of high resistance so that the initial conditions for the negative feedback upon switching of the switching transistor T2 are provided.

The base of the switching transistor T2 is connected to ground via the switching transistor T3 which, in the same manner as the switching transistor T2, is connected via an RC member C3/R3 with the induction coil 3. The RC member C3/R3 is a high pass which upon reaching a preset engine rpm switches the transistor T3 so that the base of the switching transistor T2 is connected to ground, the switching transistor T2 is blocked, and the parallel branch C4, C5 is switched off the circuit of capacitor C1.

The device for a controlled ignition of an internal combustion engine as a function of the engine rpm, especially of a two stroke engine in a hand-held working tool such as a motor chain saw etc., is of a simple construction, is comprised of conventional simple components, but ensures over a large adjustment range a reliable ignition adjusted to the engine rpm.

The present invention is, of course, in no way restricted to the specific disclosure of the specification and drawings, but also encompasses any modifications within the scope of the appended claims.

What we claim is:

1. A method of controlling ignition of an internal combustion engine as a function of engine rpm, said method comprising the steps of:

revolving a magnet wheel;

inducing with the revolving magnet wheel in an induction coil an initial voltage;

providing a primary delay element, comprising a capacitor, in closed electrical circuit with the induction coil;

connecting in parallel at least one additional delay element to the capacitor of the primary delay element;

connecting differentiating members in a closed electrical circuit to the induction coil;

connecting the differentiating members to the at least one additional delay element;

automatically switching on and off the at least one additional delay element depending on engine rpm with said differentiating members;

deducing a transformed voltage from the initial voltage via the primary delay element and the at least one additional delay element when switched on; and tripping the ignition when the transformed voltage reaches a preset threshold.

2. A method according to claim 1, wherein with increasing engine rpm the slope of the curve of the transformed voltage becomes steeper.

3. A device for controlling ignition of an internal combustion engine as a function of engine rpm, and the ignition is tripped when the transformed voltage reaches a preset threshold, said device comprising:

a magnet wheel rotating with a crankshaft of the engine;

an induction coil coordinated with said magnet wheel, wherein an initial voltage is induced in said induction coil by said magnet wheel;

a primary delay element, comprising a first capacitor, connected to said induction coil in a closed electrical circuit;

at least one switchable capacitor connected to said induction coil in parallel to said first capacitor, wherein said at least one switchable capacitor is switched on and off depending on engine rpm;

wherein a transformed voltage is deduced from the initial voltage by said first capacitor and said at least one switchable capacitor when switched on, said transformed voltage detectable at said first capacitor;

a switching device connected to said first capacitor for comparing said transformed voltage with a preset threshold and for tripping the ignition when said preset threshold is reached, wherein the transformed voltage at said first capacitor is supplied to said switching device;

differentiating members connected in a closed electrical circuit to said induction coil; and switching members for switching said at least one switchable capacitor as a function of engine rpm connected to said differentiating members.

4. A device according to claim 3, wherein said switching member is a semiconductor.

5. A device according to claim 4, wherein said semiconductor is a switching transistor.

6. A device according to claim 4, wherein two of said switchable capacitors together with a switching path of said semiconductor form a parallel branch to said first capacitor.

7. A device according to claim 6, wherein one of said switchable capacitors is switched so as to provide dynamic negative feedback and wherein the other of said switchable capacitor, functioning as a delay member, is activated depending on the steepness of the induced voltage.

8. A device according to claim 7, wherein said one switchable capacitor providing dynamic negative feedback is connected to a resistor so as to have a defined initial state.

* * * * *

UNITED STATES PATENT AND TRADEMARK OFFICE
CERTIFICATE OF CORRECTION

PATENT NO. : 5,575,260
DATED : Nov. 19, 1996
INVENTOR(S) : Trost et al

It is certified that error appears in the above-indentified patent and that said Letters Patent is hereby corrected as shown below:

On the title page:

[75] Inventors: Jürgen Trost, Grafenberg; Eberhard Schieber, Backnang, both of Germany Signed and Sealed this Fourth Day of February, 1997

Attest:

BRUCE LEHMAN

*Attesting Officer*   *Commissioner of Patents and Trademarks*